United States Patent Office 2,918,403
Patented Dec. 22, 1959

2,918,403

PHENOTHIAZINE DRENCH COMPOSITIONS

Fred N. Brooks and Robert L. Rogers, Fort Worth, Tex.; Luna Alice Rogers, executrix of said Robert L. Rogers, deceased, assignors to Texas Phenothiazine Company, Fort Worth, Tex., a corporation of Texas No Drawing. Application February 24, 1958
Serial No. 716,891

9 Claims. (Cl. 167—53)

This invention is a continuation-in-part of our combined applications Serial No. 520,493 for Helminthous Infections Control Compositions, filed July 7, 1955, and Serial No. 520,494 for Helminthous and Tapeworm Infections Control Compositions for Cattle, Sheep and Goats, filed July 7, 1955, both now abandoned, and relates to such compositions and more specifically to improved phenothiazine drench compositions. More particularly it is directed to prepared, ready-to-use suspensions of phenothiazine containing additive materials for improving the stability and shelf life of the suspensions and for improving the dispersion of the suspensions in the alimentary tracts of cattle, sheep and goats.

Phenothiazine formulations of various types have been suggested and employed in many tests reported in veterinary literature and elsewhere. Some of these formulations have very desirable qualities such as appearance, function well in dosing syringes when freshly prepared, but they deteriorate upon standing in the container prior to use and become too pasty and thick to use or they fail to function properly when introduced into the stomach such as the fourth stomach (abomasum) of ruminants. Even when freshly made, these formulations curdle when brought in contact with the digestive juices that contain minute to small percentages of acids, enzymes, sodium chloride, magnesium and calcium salts and other chemical compounds which are in solution, and act as electrolytes which alter the function of many wetting and suspending agents and medicaments. We found, for example, the bentonite suspensions of phenothiazine tend to thicken or congeal immediately upon contact with the digestive juices of the fourth stomach. This reaction with the normal and essential chemical elements, which elements are necessary for proper digestive function, seems to interfere with the normal digestion and movement of the food and medicament as shown by our test projects. Sodium alginate, which is very useful in stabilizing suspensions has, for example, been found to curdle or congeal into a semi-solid mass or lamp, even worse than bentonite when introduced into the abomasum and, even though a strong wetting agent such as sodium heptadecyl sulfate was added to the suspension, it still curdled. It was reasonable to expect that such curdling effect would prevent proper dispersion of the phenothiazine and that the curdling would tend to prevent absorption by the host animal. During tests on ruminants, employing well known phenothiazine formulations, we found that excessive absorption was not prevented. In view of several undesirable properties of bentonite and/or sodium alginate in phenothiazine suspensions, a search was made for additives to the suspension in order to overcome these objectionable aspects. Magnesium sulfate was among the additives tried in order to modify the bentonite and sodium alginate so they would function in a more desirable manner. When we added magnesium sulfate in small amounts to bentonite or bentonite-sodium alginate combined in phenothiazine suspensions, we obtained a very thick, unusable drench but, unexpectedly, upon adding more magnesium sulfate the suspension thinned to make a smooth free-flowing composition of a very desirable viscosity. To our surprise this suspension, resulting from the modification of the bentonite and/or bentonite-sodium alginate suspension, produced not only a composition of a very desirable flowability or viscosity but, even more surprising, the viscosity remained relatively constant and stable over a long period of time. This is in contrast to unmodified bentonite or bentonite-sodium alginate suspensions of phenothiazine which tend to thicken upon standing for similar periods. Moreover, when our composition was tested in the same stomach fluids as mentioned above, we unexpectedly found that it remained free-flowing and easily dispersed. Another totally unexpected result of this new formulation was the comparatively high retention of the phenothiazine in the alimentary tract as shown by controlled animal tests in which the excretion of phenothiazine was determined.

It is well known that phenothiazine is not effective against the intestinal tapeworm (Moniezia) infecting sheep, goats and cattle. Therefore, the formula given hereinafter as Example A would not be expected to control this parasite. Numerous references in veterinary literature attest to the fact that the common intestinal tapeworm causes great economic loss as evidenced by depressed weight gain and a deterioration in the health of the animal. It is, therefore, within the scope of the invention to include a metallic arsenate in the improved formula. The inclusion of a metallic arsenate as an added ingredient of the preferred formula as given in Example A would not detract or take from the importance of the modification of the bentonite or the bentonite-sodium alginate. Examples of formulas in which a metallic arsenate is employed are shown in Examples B, C and D.

This combination of additive materials also proved to be unexpectedly useful in lessening the tendency of treated animals to go off feed following treatment with the modified phenothiazine suspension even though the phenothiazine was of small particle size.

The proportion of the magnesium sulfate to be incorporated in the drench composition will vary depending upon the conditions of use. Normally this will be between 4 and 30 percent by weight of the total drench composition. Preferably the proportions used are between 8 and 25 percent by weight.

We discovered that the addition of sodium alginate to water-moistened lead arsenate tended to coat the particles of the latter. Investigating this further, we discovered that we were able to employ therapeutic doses containing an arsenate, in a phenothiazine-sodium alginate-arsenate drench, as a taeniacide, in a ratio of arsenate (lead arsenate for example) to phenothiazine of 0.6:25, whereas the therapeutic conventional doses of lead arsenate to phenothiazine, in an aqueous drench to function effectively as a taeniacide are 1:25 or greater than one part arsenate to twenty-five parts phenothiazine. Furthermore, it is generally recognized that when metallic salts of arsenic are added to water (aqueous solutions) a variable amount of hydrolyzation occurs which liberates various amounts of arsenic into soluble forms of arsenic. Now in the presence of the various elements contained in the bentonite there is the possibility of the formation of complex and undetermined arsenical compounds. Even in the presence of the magnesium sulfate modified bentonite and water a certain amount of hydrolyzation of the arsenic occurs but in much less quantities. One of the unexpected results of our discovery was that the addition of magnesium carbonate alleviated or prevented the hydrolyzation of arsenic and nullified the formation of soluble and complex arsenic derivatives. When lead arsenate is employed in the presence of water and phenothiazine it is thought that certain hydrolyzation occurs and other undesirable changes probably occur in the lead arsenate. In effect it is possible that some part of the effectiveness of the lead arsenate is lost, and to provide a therapeutic dose, consequent increase in the arsenate content was necessary. Since the sodium alginate coats the arsenate, segregating the particles thereof, in a sense, from the other ingredients and preventing hydrolyzation and the formation of unknown and/or undesirable complex arsenical compounds, we have in fact accomplished a synergistic effect inasmuch as our invention is equally as effective and less toxic at a 0.6:25 ratio as a 1:25 ratio.

As the working examples will demonstrate, the reaction of magnesium sulfate and bentonite, produced an entirely unexpected effect in increasing the dispersion of the phenothiazine and sodium alginate in the stomach fluids and unexpectedly substantially improved and prolonged the shelf life of the phenothiazine drench composition so that it retained its highly desirable thixotropic quality which facilitates its usage in dose syringes which are the preferred intruments for administering anthelmintics to ruminant animals.

The following examples illustrate typical compositions of the present invention:

We prefer phenothiazine NF purified but may employ phenothiazine NF and have used phenothiazine having a mean particle diameter not exceeding 30 microns. The lead arsenate is, preferably, standard acid lead arsenate.

The composition of Example A was employed in treating sheep No. 56, in comparison with treatment of sheep 62 with a conventional drench composition. These animals were confined in metabolism test pens. Excreta were recovered and moisture content of feces was determined, animals were similar in weight and breeding. Food rations, quantity and time of feeding were essentially the same. In the test, it was shown that the conventional, unmodified bentonite-sodium alginate-phenothiazine suspension caused an interference with normal digestive processes as judged by the lowered moisture content of the feces, and by the loss of appetite resulting in a weight loss of 7 pounds during the 3 day period post treatment that sheep 62 was on test. In contrast, sheep 56 receiving the formula set out in "Example A," suffered no interference in normal digestive processes as shown by its retention of appetite, retention of normal moisture content in its feces resulting in no weight loss, in fact animal 56 gained a total of 8 pounds during the five day period following treatment. The results of the test were as follows:

| Sheep No. | Dosage and Formula | Moisture content of feces | Effects of Treatment |
|---|---|---|---|
| 62 | 25 grams phenothiazine in customary unmodified bentonite, sodium alginate suspension in water. | Time of treatment—66.25%. 23¾ hours post-treatment—51.25%. 42½ hours post treatment—47.0%. 72 hours post treatment—50.0%. | Ate only ½ food ration during first 24 hour period post treatment, slightly over ½ ration during second 24 period and consumed only ⅝ of ration during third 24 hour period. Weight loss: 7 pounds during 72 hour test period. |
| 56 | 25 grams phenothiazine, magnesium sulphate in modified bentonite-sodium alginate suspension in water according to preferred formula given in "Example A." | Normal moisture content of feces retained through test period. | Animal did not lose appetite during test period, in fact it became more eager for food ration, eating its food quickly at each feeding period. Appeared normal throughout test. Weight loss: none, gained total of 8 pounds in a five day period post treatment. |

Example A:                                   Percent by weight
  Phenothiazine NF purified _____ 28.57
  Magnesium sulfate, U.S.P. _____ 23.81
  Bentonite (Wyoming) _____ 2.14
  Sodium alginate _____ 0.13
  Water _____ 45.35
                                                          100.00

Example B:
  Phenothiazine NF purified _____ 27.62
  Magnesium sulfate, U.S.P. _____ 22.83
  Bentonite (Wyoming) _____ 2.11
  Sodium alginate _____ 0.13
  Lead arsenate _____ 0.69
  Magnesium carbonate, U.S.P. basic _____ 0.20
  Water _____ 46.42
                                                           100.00

Example C:
  Phenothiazine NF purified _____ 35.73
  Magnesium sulfate, U.S.P. _____ 20.00
  Bentonite (Wyoming) _____ 1.87
  Magnesium carbonate, U.S.P. basic _____ 0.41
  Lead arsenate _____ 0.75
  Sodium alginate _____ 0.06
  Water _____ 41.18
                                                           100.00

Example D:
  Phenothiazine NF purified _____ 34.88
  Magnesium sulfate, U.S.P. _____ 17.44
  Bentonite (Wyoming) _____ 1.83
  Magnesium carbonate _____ 0.81
  Sodium arsenate _____ 0.70
  Sodium alginate _____ 0.05
  Water _____ 44.29
                                                           100.00

The composition of Example B was tested in the treatment of calf No. 46 as compared with the treatment of calf 51 with a conventional drench formula. The two calves were grade Herefords and held in the same pen under dry-lot feeding conditions and were taking a full feeding of a conventional fattening ration when they were treated as follows on March 26, 1956:

Calf No. 51 was given a conventional drench formula containing phenothiazine and lead arsenate suspended in bentonite, sodium alginate and water. The phenothiazine dosage was at the level of 8 grams per 100 lbs. of body weight and the lead arsenate dosage was 0.2 gram per 100 lbs. of body weight.

Calf No. 46 was given a drench made according to the composition disclosed herewith as Example B so that this animal received a dosage of phenothiazine at the level of 8 grams per 100 lbs. of body weight and the lead arsenate dosage level was 0.2 gram per 100 lbs. of body weight.

The two calves were kept in the same lot and on the same feed for seven weeks after treatment. By the end of this period calf No. 51 had shown an average daily gain of 2.43 lbs. Calf No. 46 had shown an average daily gain of 3.14 lbs. per day. Thus we found that the improved formula given to calf No. 46 gave a net return of 0.71 lb. per day above the conventional formula given to calf No. 51.

Referring to Example C, the drench was employed in treating sheep No. 62 while sheep 63 was treated as indicated below. These animals were confined in metabolism test pens for recovery of all excreta. Moisture determinations were made by drying fecal samples at 100° to 105° C. for 24 hours and recording weight loss as percent moisture. This shows that the formula of Example C caused less upset to the normal digestive processes. The loss of appetite and loss of weight in animal 63 indicated the toxic effects of the unimproved formula. This difference in no weight loss in animal 62 compared to a loss of 4.5 pounds in animal 63 is of economic importance.

| Sheep No. | Dosage and Formula | Percent Moisture in feces | | | | Effect of Treatment |
|---|---|---|---|---|---|---|
| | | Before Treatment | | After Treatment | | |
| | | Min. | Max. | Min. | Max. | |
| 63 | 25 grams phenothiazine, 0.333 gram lead arsenate in unmodified bentonite suspension in water. | 58.5 | 62.5 | 49.0 −9.5 | 56.5 −6.0 | Ate ⅓ of food ration during first 24 hour period. Ate ⅔ of food ration during second 24 hour period of test post treatment. Weight loss, 4.5 pounds during 80 hour test period. |
| 62 | 25 grams phenothiazine, 0.5 gram lead arsenate, 14 grams magnesium sulfate in modified bentonite-sodium alginate suspension with magnesium carbonate as in Example C. | 49.0 | 51.75 | 50.5 +1.5 | 54.75 +3.0 | Ate all of food ration early in each 24 hour period post treatment. Appeared normal clinically. Weight loss: none during 80 hour test period. |

Employing the drench of Example D in treating sheep 63 as compared with the treatment of sheep 62 with a conventional drench we ascertained the following:

| Sheep No. | Dosage and Formula | Percent Moisture in feces | | | | Effect of Treatment |
|---|---|---|---|---|---|---|
| | | Before Treatment | | After Treatment | | |
| | | Min. | Max. | Min. | Max. | |
| 62 | 25 grams phenothiazine, 0.5 gram sodium arsenate in unmodified bentonite suspension in water. | 63.0 | 67.0 | 55.0 −8.0 | 85.0 +18.0 | Animal showed signs of distress, developed diarrhea. Ate only ½ food ration first 24 hour period post treatment and ate ¾ ration during second 24 hour period. Weight loss: 6 pounds during 80 hour test period. |
| 63 | 25 grams phenothiazine, 0.5 gram sodium arsenate, 14 grams magnesium sulphate, magnesium carbonate in modified bentonite-sodium alginate suspension in water as in Example D. | 51.0 | 59.75 | 53.25 +2.25 | 62.0 +2.25 | No signs of distress or diarrhea. Ate ¾ food ration during first 24 hour period post treatment, and nearly all of ration during the second 24 hour period. Weight loss: 1 pound during 80 hour test period. |

These animals (sheep 62 and 63) were confined in metabolism test pens for recovery of all excreta. Moisture determinations were made by drying fecal samples at 100° to 105° C. for 24 hours and recording weight loss as percent moisture. It is shown in this test that the unmodified formula given to animal 62 caused a loss of moisture in the feces immediately after treatment followed by an excess of moisture content resulting in diarrhea, loss of appetite, signs of distress and culminating in a loss of 6 pounds in weight during the test period. In contrast animal 63, receiving the preferred formula, showed only slight inappetence and lost only 1 pound in weight during the same test period. Animal 63 did not develop signs of distress nor develop diarrhea. In this test there is an indicated difference of 5 pounds in weight between the two animals.

A further test was set up so that two or more different formulations could be given to the same calf. (No. 78, a Hereford steer calf) in order to eliminate variations in individual animals (as suggested by a Texas A. & M. nutritionist). During and between each test period the No. 78 Hereford steer calf was kept in the same shaded pen with the same feeding and care. On August 1, 1956, he was given a drench containing phenothiazine and lead arsenate formulated in accordance with the composition of this invention as disclosed in Example B so that the phenothiazine dosage level was 10 grams per 100 lbs. body weight. This weight gain during the following 28 days was 38 lbs. which represented an average of 1.36 lbs. per day. On November 5, 1956, he was given a drench containing phenothiazine and lead arsenate made in the conventional manner with bentonite and water so that the phenothiazine dosage level was 10 grams per 100 lbs. body weight. His weight gain during the following 28 days was 28 lbs. which represented an average of 1.0 lb. per day. Thus we found that the improved composition herewith disclosed had shown a net daily average gain of 0.36 lb. per day over the conventional formula given to the same animal held under similar conditions.

In addition a purebred Hereford steer calf No. 80 was given three different formulations of phenothiazine. During and between tests he was given a daily ration consisting of a limited amount of 20% protein-grain pellets and alfalfa hay plus prairie hay free choice. Following each treatment his weight was recorded regularly and the daily average gain for a two week period immediately after each treatment was found to be as follows:

(1) On July 24, 1956, calf No. 80 was given a drench made according to Example B so that the dosage represented 10 grams of phenothiazine per 100 lbs. body weight plus the normal lead arsenate dosage. His daily average weight gain for the following two weeks was 2.2 lbs. per day.

(2) On August 13, 1956, calf No. 80 was given a drench made according to a conventional formula using bentonite in water as the suspending medium. The dosage level was 10 grams per 100 lbs. body weight with the normal dosage of lead arsenate. His daily average weight gain during the following two weeks was 1.36 lbs. per day.

(3) On November 5, 1956, calf No. 80 was given a phenothiazine molasses composition mixed in his regular feed so that the phenothiazine dosage level was 10 grams per 100 lbs. body weight. His daily average weight gain during the following two weeks was 0.93 lbs. per day.

In all three tests the phenothiazine had an average particle size of 9 to 11 microns as specified by the manufacturers from whom we obtained the material. In these tests involving the same individual animal, the results of different formulations are clearly seen. Thus on test (1) the animal gained an average of 2.2 pounds per day over a 2 week period following treatments with the improved formula in contrast to an average daily gain over another 2 week period following treatment with a conventional unmodified formula. This is a different of 0.84 pound per day in favor of our formula as disclosed herewith.

We prefer to employ the percentages of ingredients as specified in Examples A, B, C and D. However it is within the scope of this invention that reasonable variations may be made in one or more of the ingredients without departing from the spirit of the invention or scope of the claims. For example the phenothiazine can be varied depending upon the viscosity desired in the finished suspension and upon the amount of this ingredient desired in each fluid ounce or unit of measure. Likewise, as this ingredient is reasonably varied, compensating adjustments may be made in one or more of the other ingredients. That is, exact percent of magnesium sulfate will depend upon the desired viscosity and upon the amounts of bentonite and/or sodium alginate employed. Likewise, the magnesium carbonate may vary according to the percentage of metallic arsenate employed.

We claim:

1. A helminthous infection control composition for veterinarian use, in the form of a ready-to-use drench, containing, as its essential active ingredients, phenothiazine, bentonite and magnesium sulfate, said magnesium sulfate being in weight, in proportion to the weights of the other ingredients, sufficient to render the bentonite freely flowable and readily dispersible in the fluids in the animal stomachs into which said composition is introduced.

2. A composition in the form of a suspension comprising a major proportion of phenothiazine, a minor proportion of bentonite, a minor proportion of sodium alginate, a proportion of magnesium sulfate sufficient to modify the bentonite and stabilize the flow characteristics of the suspension, and water, said proportions being by weight.

3. A composition for veterinary use in the form of a water suspension comprising a major proportion of phenothiazine having a mean particle diameter not exceeding 30 microns, a minor proportion of bentonite from 1.0 to 4.0 percent, a proportion of magnesium sulfate from 8.0 to 30.0 percent, and water, said proportions being by weight.

4. A composition for veterinary use in the form of a water suspension comprising substantially 28.57 percent phenothiazine having an average particle size not exceeding 30 microns in diameter, 2.14 percent bentonite, 0.13 percent sodium alginate, 23.81 percent magnesium sulfate, and 45.35 percent water, said percentages being by weight.

5. A prepared ready-to-use drench composition for veterinary use, said composition comprising a major proportion of phenothiazine of not in excess of 30 microns average particle diameter; a minor proportion of a metallic arsenate; a minor proportion of magnesium carbonate; a minor proportion of bentonite and a minor proportion of sodium alginate; magnesium sulfate in sufficient proportion to modify the bentonite and stabilize the flow characteristics of the suspension; and water, said proportions being by weight.

6. A composition for veterinary use in the form of a water suspension comprising substantially 20 to 40 percent of an anthelmintic selected from the group consisting of phenothiazine NF and phenothiazine NF purified; substantially 1.0 to 3.0 percent bentonite; substantially 0.05 to 0.5 percent sodium alginate; substantially 0.7 to 1.4 percent of a metallic arsenate selected from the group consisting of lead arsenate, sodium arsenate and magnesium arsenate; substantially 0.1 to 1.0 percent magnesium carbonate, substantially 8.0 to 30.0 percent magnesium sulfate as a modifier for the bentonite and water, said percentages being by weight.

7. A prepared ready-to-use drench composition for veterinary use, said composition comprising a major proportion of phenothiazine of not in excess of 30 microns average particle diameter; a minor proportion of metallic arsenate, the proportion of said arsenate and phenothiazine being as 0.6:25; a minor proportion of magnesium carbonate; a minor proportion of bentonite; a minor proportion of sodium alginate coated upon said metallic arsenate; magnesium sulfate in sufficient proportion to modify the bentonite so that the viscosity of said bentonite is stabilized when said composition is introduced to the stomach fluids of animals; and water, said proportions being by weight.

8. The method of controlling helminthous infections of cattle, sheep and goats which comprises introducing into the alimentary tract of the animal the composition of claim 1.

9. The method of controlling helminthous infections of cattle, sheep and goats which comprises introducing into the alimentary tract of the animal the composition of claim 4.

References Cited in the file of this patent
UNITED STATES PATENTS

| 2,407,486 | Flenner | Sept. 10, 1946 |
| 2,439,532 | Whiting | Apr. 13, 1948 |

OTHER REFERENCES

Harwood: Proc. of Wash. Helminthological Soc., January 1953, pp. 29–31.

Milks: Veterinary Pharmacology, Materia Medica and Ther., 6th ed., 1949, pp. 249, 300 and 455.

UNITED STATES PATENT OFFICE
CERTIFICATE OF CORRECTION

Patent No. 2,918,403                                            December 22, 1959

Fred N. Brooks et al.

It is hereby certified that error appears in the printed specification of the above numbered patent requiring correction and that the said Letters Patent should read as corrected below.

Column 1, line 53, for "lamp" read -- lump --; column 5, line 72, for "This" read -- His --; column 7, line 6, for "different" read -- difference --.

Signed and sealed this 24th day of May 1960.

(SEAL)
Attest:

KARL H. AXLINE
Attesting Officer

ROBERT C. WATSON
Commissioner of Patents